June 6, 1972 J. F. SMELTZER 3,667,708
COMBINATION FISHING ROD AND FLASHLIGHT HOLDER ATTACHMENT
Filed April 1, 1970

INVENTOR
JOHN F. SMELTZER
BY
Zarley, McKee & Thomte
ATTORNEYS

United States Patent Office 3,667,708
Patented June 6, 1972

3,667,708
COMBINATION FISHING ROD AND FLASHLIGHT
HOLDER ATTACHMENT
John F. Smeltzer, Meriden, Iowa 51037
Continuation-in-part of application Ser. No. 889,484,
Dec. 31, 1969. This application Apr. 1, 1970, Ser.
No. 24,651
Int. Cl. A01k 97/10
U.S. Cl. 248—39
2 Claims

ABSTRACT OF THE DISCLOSURE

A combination fishing rod and flashlight holder attachment for use with a cylindrical container comprising a flexible band adapted to be extended around the container and secured thereto. A first tubular support member is selectively movably secured to the band and is adapted to receive one end of a fishing rod therein to support the same. Second and third tubular support members are adjustably movably secured to the band on opposite sides of the first support member and are adapted to receive either a flashlight or a fishing rod therein to support the same. The attachment includes tightening means to maintain the band on the container in the selected position and to permit the attachment to be easily removed therefrom. The first support member also has means thereon for supporting a flashlight thereon. A stringer attachment is secured to the band below the first support member to permit a stringer to be secured to the attachment. The second and third support members extend upwardly and outwardly from the band and are designed to permit the fisherman to fish at night with a flashlight being placed in one of the tubular support members so as to direct light on the upper end of the fishing rod in the first support member. The second and third support members are spaced approximately 180 degrees apart with respect to the container to permit the fisherman to selectively use either of the same depending upon the direction of the stream flow. The first support member also has means thereon for supporting a flashlight thereon.

---

This is a continuation-in-part application of the application Ser. No. 889,484, filed Dec. 31, 1969, now Patent No. 3,603,019 dated Sept. 7, 1971.

The principal object of this invention is to provide a combination fishing rod and flashlight holder attachment for use with a cylindrical container.

A further object of this invention is to provide a combination fishing rod and flashlight holder attachment with a stringer attachment secured thereto.

A further object of this invention is to provide a combination fishing rod and flashlight holder attachment which permits light to be directed at the upper end of the fishing pole or poles supported thereby.

A further object of this invention is to provide a combination fishing rod and flashlight holder attachment having a pair of spaced apart flashlight holders mounted thereon with a fishing pole holder positioned intermediate therebetween so that light may be directed at the upper end of the fishing pole whether current flow is to the right or the left with respect to the attachment.

A further object of this invention is to provide a combination fishing rod and flashlight holder attachment which permits the fisherman to have free use of his hands in either the baiting process or tackle repair.

A further object of this invention is to provide a combination fishing rod and flashlight holder attachment having at least one flashlight holder provided thereon which extends upwardly and outwardly therefrom so that the light from the flashlight will be projected into the air rather than on the water.

A further object of this invention is to provide a combination fishing rod and fishing holder attachment which permits the fishing pole to be quickly removed from the fishing pole holder without affecting the fishing line.

A further object of this invention is to provide a combination fishing rod and flashlight holder attachment which may be easily transferred from one cylindrical container to another container.

A further object of this invention is to provide a combination fishing rod and flashlight holder attachment for use with a cylindrical container which provides a stable support means for the flashlight and fishing rod.

A further object of this invention is to provide a combination fishing rod and flashlight holder attachment for use with a cylindrical container which permits the flashlight and fishing rod to be selectively positioned with respect to the cylindrical container.

A further object of this invention is to provide a combination fishing rod and flashlight holder attachment for use with a cylindrical container which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
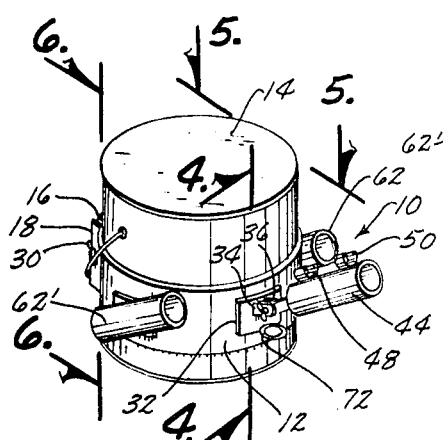
FIG. 1 is a perspective view of the attachment of this invention mounted on a cylindrical container.

The attachment of this invention is indicated generally by the reference numeral 10 and comprises a flexible or semi-flexible band 12 adapted to be secured to a cylindrical container such as a pail 14. Pail 14 may be a minnow bucket, water pail or any other cylindrical member suited for supporting the band 12 and which is sufficiently strong to withstand the weight of the fisherman thereon.

Figure 6:
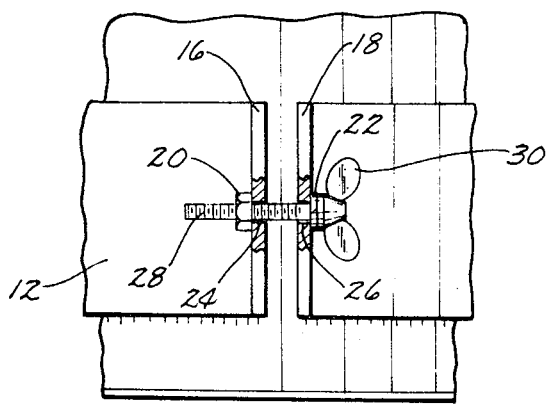
FIG. 6 is an enlarged fragmentary sectional view as seen along line 6—6 of FIG. 1.

Band 12 has a pair of parallel end portions 16 and 18 which extend rearwardly therefrom as illustrated in FIG. 6 End portion 16 has a nut 20 secured thereto while end portion 18 preferably has a washer 22 secured thereto as seen in FIG. 6. End portions 16 and 18 are provided with openings 24 and 26 formed therein respectively adapted to receive a bolt 28 extending therethrough. Bolt 28 has a wing head 30 at one end thereof to provide a convenient means of threadably moving bolt 28 to draw end portions 16 and 18 together so as to tighten band 12 on the pail 14. Bolt 28 can obviously be threadably moved to permit the band 12 to be removed from the container as desired.

Figure 4:
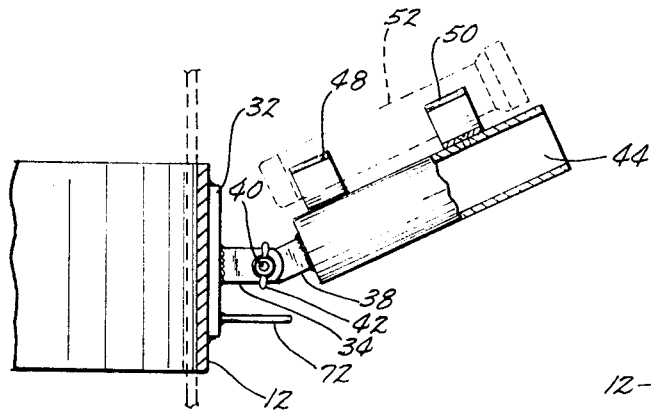
FIG. 4 is an enlarged sectional view as seen along line 4—4 of FIG. 1.

Plate 32 is secured to band 12 at the forward end thereof by welding or the like and has a pair of spaced apart ears 34 and 36 secured thereto which extend outwardly therefrom. Ear 38 is selectively pivotally secured between the ears 34 and 36 by a bolt 40 extending therethrough. Bolt 40 may be tightened by means of a wing nut 42 to permit the selective positioning of ear 38 with respect to ears 34 and 36. A hollow tubular support member 44 is secured to ear 38 by welding or the like and is adapted to receive and support one end of a fishing rod or pole 46 therein. A pair of spaced apart resilient brackets 48 and 50 are secured to the upper surface of support member 44 as illustrated in FIG. 4 for selectively supporting a flashlight 52 therein at times.

Figure 5:
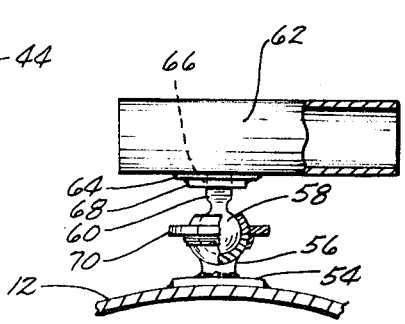
FIG. 5 is an enlarged fragmentary sectional view as seen along line 5—5 of FIG. 1.

Plate 54 is secured to band 12 at one side thereof by welding or the like and has a ball socket 56 secured thereto as illustrated in FIG. 5. Socket 56 is adapted to receive a ball 58 therein which has a threaded stem 60 secured thereto and extending outwardly therefrom. The numeral 62 designates a tubular support member having a bracket 64 secured to one side thereof. Bracket 64 has a threaded opening 66 formed therein adapted to threadably receiving the end of stem 60. Stem 60 has a lock nut 68 threadably mounted thereon for preventing undesired movement between stem 60 and bracket 64 on support member 62. If desired, ball socket 56 may have a locking collar means 70 provided thereon for rigidly maintaining ball 58 in various positions with respect to socket 56. Support member 62 is adapted to receive and support either a flashlight (FIG. 2) or one end of a fishing pole or rod therein. The ball and socket connection of the support member 62 to the band 12 permits the support member to be selectively moved to the desired position.

The numeral 62' refers to another support member at the other side of band 12 which is identical to support member 62 and which will not be described in detail for purposes of conciseness. Stringer attachment 72 is secured to band 12 by welding or the like below ears 34 and 36 to provide a convenient means for attaching a stringer to the device.

Figure 2:
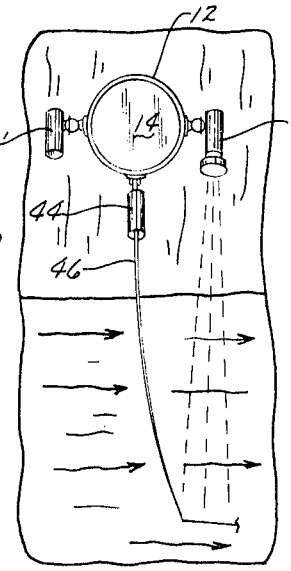
FIG. 2 is a top view of the attachment mounted on a container illustrating a flashlight in one of the flashlight holders with a fishing pole being mounted in the fishing pole holder, the arrows depicting the direction of current flow.
Figure 3:
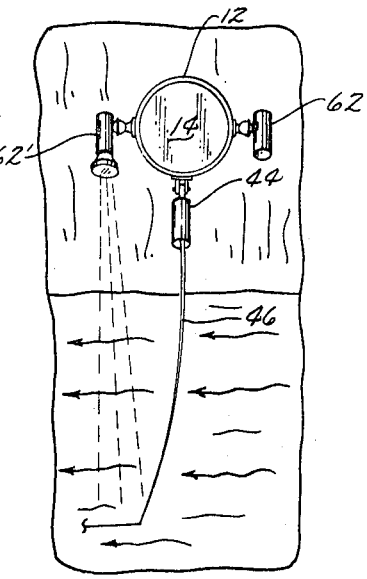
FIG. 3 is a view similar to FIG. 2 except that the flashlight is mounted in the opposite flashlight holder to compensate for current flow which is depicted by arrows.

Preferably, band 12 is constructed of a flexible or semi-flexible steel material having the configuration of the cylindrical container 14 upon which it will be installed. It is preferred that the container 14 be either of a five or seven gallon size but the container may be comprised of a minnow bucket if desired. The attachment 10 is mounted on the container 14 from the bottom thereof with the bolt 28 being tightened to draw the band 12 tightly around the exterior surface of the container. Preferably, band 12 is approximately four inches wide with the bottom edge thereof being spaced approximately two inches from the lower end of the container. Assuming that only a single fishing pole is being used, the pole 46 would be inserted downwardly into the support member 44 as illustrated in FIG. 2. With the pole 46 in support member 44, the fisherman has his hands free to make repairs on the tackle and to bait the hook. Assuming that the current is flowing to the right as viewed in FIG. 2, a flashlight would be inserted into the support member 62 so that the beam of light therefrom would be directed at the upper end of the pole 46. The current drag on the fishing line causes the pole 46 to be deflected in the direction of the current as viewed in FIG. 2 and the beam of light from the flashlight would be projected upwardly into the air on the end of the fishing pole 46 and the line so that the fisherman can observe the same. FIG. 3 illustrates the current flowing in a direction opposite to that of FIG. 2 and such a situation requires that the flashlight be inserted into the support member 62' rather than the support member 62 so that the beam of light therefrom will be directed at the upper end of the pole and line which is now being deflected in a direction opposite to that illustrated in FIG. 2. The fact that the support members 62 and 62' are movably mounted with respect to the band 12 permits the fisherman to precisely adjust the same so that the flashlight mounted therein will direct its beam of light to the proper position. Likewise, the fact that support member 44 is movably mounted with respect to the band 12 permits the fisherman to precisely adjust the angle of the fishing pole 46.

If the fisherman is fishing for bullheads or the like, he would ordinarily employ two fishing poles and the two fishing poles would be mounted in the support members 62 and 62' with the flashlight being mounted in the brackets 48 and 50 (FIG. 4) so that the beam of light therefrom would illuminate the upper ends of both of the poles. The fact that the support members 62 and 62' are movable permits the bullhead fisherman to move the same so that the fishing poles therein may be extended upwardly and outwardly with respect to each other to provide the fisherman with a greater range of fishing area. The support member 44 may also support a flashlight therein if desired during the fishing operation. The configuration of the support members 44, 62 and 62' is such that the fishing pole may be easily removed therefrom without disturbing the line. Such a feature is extremely important since any slight disturbance of the line could cause the fish to drop the bait.

While the drawings illustrate support members 62 and 62' being approximately 180 degrees apart on opposite sides of the container, it should be understood that the support members 62 and 62' could be moved closer towards the support member 44 if desired. The stringer attachment 72 provides a convenient means for the fisherman to secure his stringer and such an attachment makes it impossible for the fisherman to leave the fishing area without taking the stringer with him. The handle on the container 14 provides a convenient means for carrying the container. Upon completion of the fishing operation, the fisherman would simply remove the flashlight from either of the support members 62 or 62' and insert the same in the brackets 48 and 50. The support members 62 and 62' would be moved so as to be vertically disposed so that they would not become entangled with the underbrush as the fisherman leaves the fishing area. If desired, a fishing pole could be left in the vertically disposed support members thereby providing a convenient means for the fisherman to carry the fishing pole when leaving the fishing area. A fisherman may adjust the support member 44 so that the flashlight 52 in the brackets 48 and 50 will illuminate the area immediately ahead of the fisherman as he is leaving the fishing area. The brackets 48 and 50 prevent the flashlight 52 from becoming inadvertently dislodged from the attachment during the carrying operation.

The fact that the attachment 10 is easily removed from the container 14 permits the attachment to be installed on another container should the container become unserviceable. Thus it can be seen that an extremely useful attachment has been provided for a cylindrical container which frees the fisherman's hands and which provides a convenient means for illuminating the upper ends of the fishing pole to aid the fisherman in his fishing operation. The attachment 10 is easily secured to the container 14 and is easily removable therefrom through the use of the tightening means at the rear end of the band 12. Thus it can be seen that the device accomplishes at least all of its stated objectives.

I claim:

1. In combination,
    a cylindrical bucket means having upper and lower ends, the upper end of said bucket means serving as a seat for the fisherman,
    and a flexible band means removably embracing said bucket means adjacent the lower end thereof,
    a first tubular support member having upper and lower ends, said first tubular support members being selectively pivotally secured at its lower end to said band means and normally extending upwardly and outwardly therefrom and being adapted for supporting one end of a fishing pole means therein;
    second and third tubular support members having upper and lower ends and being selectively pivotally secured at their lower ends to said band means on the opposite sides of said bucket means, said second and third tubular suport members normally extending upwardly from said band means, each of said second and third tubular supports adapted to selectively receive one of a fishing pole means and light means therein and to support the same, said first tubular support member being positioned on said band means between said second and third support members, and means for tightening said band means on said bucket means.

2. The combination of claim 1 wherein said first support member is pivotally secured to said band means about a horizontal axis, said second and third support members being pivotally secured to said band means by a ball and socket joint means, and a flashlight holder means on said first support member for mounting a flashlight therein so that the flashlight can direct a beam of light onto the upper end of the fishing pole means in said first support member.

References Cited

UNITED STATES PATENTS

| | | | |
|---|---|---|---|
| 1,737,151 | 11/1929 | Derbyshire | 248—39 |
| 1,653,083 | 12/1927 | Blaw | 248—42 X |
| 2,548,351 | 4/1951 | Coombs | 248—42 |
| 2,817,472 | 12/1957 | Parkhurst | 224—5-8 |
| 3,077,327 | 2/1963 | Batie | 248—42 |
| 2,042,385 | 5/1936 | Boring | 248—229 X |
| 2,864,510 | 12/1958 | Sture | 220—85 R X |
| 1,169,198 | 1/1916 | Schumacher | 220—85 D X |

FOREIGN PATENTS

| | | | |
|---|---|---|---|
| 1,580,974 | 9/1969 | France | 43—55 |

CHANCELLOR E. HARRIS, Primary Examiner

U.S. Cl. X.R.

43—21.2; 220—85 R; 248—42, 231